United States Patent [19]

Furlong

[11] Patent Number: 5,099,500
[45] Date of Patent: Mar. 24, 1992

[54] SYMBOL DETECTION AND ERROR CORRECTION CODING IN A LOCAL AREA NETWORK

[75] Inventor: Darrell Furlong, Uxbridge, Mass.

[73] Assignee: Concord Communications, Inc., Marlboro, Mass.

[21] Appl. No.: 257,638

[22] Filed: Oct. 14, 1988

[51] Int. Cl.$^5$ .......................................... H04L 27/06
[52] U.S. Cl. ...................................... 375/94; 371/57.2
[58] Field of Search ....................... 375/17, 34, 57, 94; 371/55, 56, 57.1, 57.2; 370/85.4, 85.5, 85.2

[56] References Cited

U.S. PATENT DOCUMENTS

| | | | |
|---|---|---|---|
| 4,507,777 | 3/1985 | Tuck et al. | 370/86 |
| 4,519,070 | 5/1985 | Bell | 370/88 |
| 4,536,874 | 8/1985 | Stoffel et al. | 370/94 |
| 4,566,097 | 1/1986 | Bederman | 370/85.6 |
| 4,590,468 | 5/1986 | Stieglitz | 370/94 |
| 4,677,627 | 6/1987 | Hong | 371/57 |
| 4,791,311 | 12/1988 | Vig | 370/85.1 |
| 4,860,309 | 8/1989 | Costello | 370/85.1 |
| 4,864,557 | 9/1989 | Morton et al. | 370/17 |

FOREIGN PATENT DOCUMENTS 0229158 1/1987 European Pat. Off. .
0207243 7/1987 European Pat. Off. .

OTHER PUBLICATIONS

*Token Passing Bus Access Method and Physical Layer Specification IEEE Std 802.4-1985* (1985), pp. 19-26, 42-53, 54-76.
De on, M., "The User's Guide to MAPBroadband: High Speed LAN Data Transmission Oversee CATV Networks" (1985).
Klein, M. T., "IEEE 802.4 Standards for Factory Communication: An Overview" (1985).
Stallings, W., "A Tutorial on the IEEE 802 Local Networks Standards" (1986).

*Primary Examiner*—Stephen Chin
*Attorney, Agent, or Firm*—Cesari & McKenna

[57] ABSTRACT

A symbol detection and correction scheme for local area network modems, especially those which receive one of three symbols at any given time, such as those operating in accordance with the IEEE 802.4 standard. The invention significantly improves the bit error rate observed by the layer above the modem. The modem operates on a received signal with a pair of slicers. One slicer operating as a two-symbol detector, and a second slicer operates as a three-symbol detector. A receiver state machine is used to keep track of which portion of a frame is currently expected to be being received. Depending upon the particular context, one or both of the slicer outputs are used by the state machine to determine which of the three symbols was received. For example, when the receiver is in a state where only one of two data symbols are expected, and no control symbols are expected, only the two-symbol slicer output is used. The three-symbol slicer output, and logical combinations of the three-symbol slicer output and the two-symbol slicer output, are used as other times. The receiver state machine recognizes errors in pseudo-silence, start delimiter, and end-delimiter sequences without reporting such errors to the upper level, thereby greatly decreasing the error rate observed there.

10 Claims, 12 Drawing Sheets

| Inputs | | | | | | | | | Outputs | | | |
|---|---|---|---|---|---|---|---|---|---|---|---|---|
| Shift Register | | | | | | | | CNT IN | | DATA OUT | CNT OUT | Next State |
| 0 | 1 | 2 | 3 | 4 | 5 | 6 | 7 | | | | | |
| x | x | x | x | x | x | x | n | 0,4 | | Si | +1 | psil |
| x | x | x | x | x | x | x | 1 | 1,5 | | Si | +1 | psil |
| x | x | x | x | x | x | x | + | 2,6 | | Si | +1 | psil |
| x | x | x | x | x | x | x | n | 3,7 | | Si | +1 | psil |
| x | x | x | x | x | x | x | d | 0,4 | | Si | +1 | psil |
| x | x | x | x | x | x | n | d | 3,7 | | Si | +1 | psil |
| x | x | x | x | x | x | d | d0 | 3,7 | | Dt0 | +1 | prem |
| x | x | x | x | x | x | d | d1 | 3,7 | | Dt1 | 0 | prem |
| x | x | x | x | x | x | x | d1 | 1,5 | | Dt1 | 0 | prem |
| x | x | x | x | x | x | x | n1 | 1,5 | | Dt1 | 0 | prem |
| x | x | x | x | x | x | x | d0 | 2,6 | | Dt0 | +1 | prem |
| x | x | x | x | x | x | x | d0 | 2,6 | | Dt0 | +1 | prem |

Pseudo-Silence State Table (psil)

FIG. 4

| Inputs | | | | | | | | | Outputs | | |
|---|---|---|---|---|---|---|---|---|---|---|---|
| Shift Register | | | | | | | | CNT IN | DATA OUT | CNT OUT | Next State |
| 0 | 1 | 2 | 3 | 4 | 5 | 6 | 7 | | | | |
| d1 | n | n | n | d1 | d0 | n | n | x | Pd | 0 | psil |
| d0 | d0 | n | n | n | d0 | n | n | x | Nd | 0 | sdel |
| d0 | d0 | n | n | n | d0 | n | dy | – | Nd | 0 | sdel |
| d0 | d0 | n | n | n | d0 | x | n | – | Nd | 0 | sdel |
| d0 | d0 | n | n | n | x | n | n | – | Nd | 0 | sdel |
| d0 | d0 | n | n | x | d0 | n | n | – | Nd | 0 | sdel |
| d0 | d0 | n | x | n | d0 | n | n | – | Nd | 0 | sdel |
| d0 | d0 | x | n | n | d0 | n | n | – | Nd | 0 | sdel |
| d0 | x | n | n | n | d0 | n | n | – | Nd | 0 | sdel |
| < not above > | | | | | | | d1 | x | Dt1 | 0 | prem |
| < not above > | | | | | | | d0 | x | Dt0 | +1 | prem |
| < not above > | | | | | | | n1 | x | Dt1 | 0 | prem |
| < not above > | | | | | | | n0 | x | Dt0 | +1 | prem |

Preamble State Table (prem)

FIG. 5A

| Inputs | | | | | | | | | Outputs | | |
|---|---|---|---|---|---|---|---|---|---|---|---|
| Shift Register | | | | | | | | CNT IN | DATA OUT | CNT OUT | Next State |
| 0 | 1 | 2 | 3 | 4 | 5 | 6 | 7 | | | | |
| 1 | 1 | 1 | n | n | 1 | n | dy | 7 | Nd | 0 | sdel |
| 1 | 1 | 1 | n | n | 1 | x | n | 7 | Nd | 0 | sdel |
| 1 | 1 | 1 | n | x | 1 | n | n | 7 | Nd | 0 | sdel |
| 1 | 1 | 1 | x | n | 1 | n | n | 7 | Nd | 0 | sdel |
| d0 | d0 | d0 | n | n | d0 | n | n | x | Nd | 0 | sdel |
| d1 | d0 | d0 | n | d1 | d0 | n | n | x | Bd | 0 | psil |
| x | x | x | x | x | x | x | − | 0,2,4,6 | Dt0 | +1 | ipre |
| x | x | x | x | x | x | x | + | 1,3,5,7 | Dt1 | +1 | ipre |
| x | x | x | x | x | x | x | + | 0,2,4,6 | Dt1 | 0 | prem |
| x | x | x | x | x | x | x | − | 1,3,5,7 | Dt0 | 1 | prem |

Interframe Preamble State Table (ipre)

FIG. 5B

| Inputs | | | | | | | | | | Outputs | | |
|---|---|---|---|---|---|---|---|---|---|---|---|---|
| Shift Register | | | | | | | | | CNT IN | DATA OUT | CNT OUT | Next State |
| 0 | 1 | 2 | 3 | 4 | 5 | 6 | 7 | | | | | |
| x | x | x | x | x | x | x | ny | 0 | | Nd | 1 | sdel |
| x | x | x | x | x | x | x | d0 | 1 | | Dt0 | 2 | sdel |
| x | x | x | x | x | x | x | ny | 2 | | Nd | 3 | *sdel* |
| x | x | x | x | x | x | x | ny | 3 | | Nd | 4 | sdel |
| x | x | x | x | x | x | x | d0 | 4 | | Dt0 | 5 | sdel |
| x | x | x | x | x | x | x | d0 | 5 | | Dt0 | 6 | sdel |
| x | x | x | x | x | x | x | d0 | 6 | | Dt0 | 7 | sdel |
| x | x | x | x | x | x | x | dy | 0 | | Nd | 1 | sdel |
| x | x | x | x | x | x | x | d1 | 1 | | Dt0 | 2 | sdel |
| x | x | x | x | x | x | x | ny | 1 | | Dty | 2 | sdel |
| x | x | x | x | x | x | x | dy | 2 | | Nd | 3 | sdel |
| x | x | x | x | x | x | x | dy | 3 | | Nd | 4 | sdel |
| x | x | x | x | x | x | x | d1 | 4 | | Dt0 | 5 | sdel |
| x | x | x | x | x | x | x | ny | 4 | | Dt0 | 5 | sdel |
| x | x | x | x | x | x | x | d1 | 5 | | Dt0 | 6 | sdel |
| x | x | x | x | x | x | x | ny | 5 | | Dt0 | 6 | sdel |
| x | x | x | x | x | x | x | d1 | 6 | | Dt0 | 7 | sdel |
| x | x | x | x | x | x | x | dy | 6 | | Dt0 | 7 | sdel |
| – | – | – | n | n | – | n | dy | 7 | | Nd | 0 | sdel |
| – | – | – | n | n | – | x | n | 7 | | Nd | 0 | sdel |
| – | – | – | n | x | – | n | n | 7 | | Nd | 0 | sdel |
| – | – | – | x | n | – | n | n | 7 | | Nd | 0 | sdel |
| x | x | + | n | n | + | n | dy | 7 | | Nd | 0 | edel |
| x | x | + | n | n | + | x | n | 7 | | Nd | 0 | edel |
| x | x | + | n | x | + | n | n | 7 | | Nd | 0 | edel |
| x | x | + | x | n | + | n | n | 7 | | Nd | 0 | edel |
| d1 | d0 | n | n | d1 | d0 | n | n | x | | Bd | 0 | psil |
| | | < | not above | | > | | dy | 7 | | Dty | 0 | data |
| | | < | not above | | > | | ny | 7 | | Dty | 0 | data |

Start Delimiter State Table (sdel)

FIG. 6

| Inputs | | | | | | | | | | Outputs | | | |
|---|---|---|---|---|---|---|---|---|---|---|---|---|---|
| Shift Register | | | | | | | | CNT IN | KCK IN | DATA OUT | CNT OUT | Next State | KCK OUT |
| 0 | 1 | 2 | 3 | 4 | 5 | 6 | 7 | | | | | | |
| − | − | − | n | n | − | n | dy | 7 | x | Nd | 0 | sdel | cpk |
| − | − | − | n | n | − | x | n | 7 | x | Nd | 0 | sdel | cpk |
| − | − | − | n | x | − | n | n | 7 | x | Nd | 0 | sdel | cpk |
| − | − | − | x | n | − | n | n | 7 | x | Nd | 0 | sdel | cpk |
| x | x | + | n | n | + | n | dy | 7 | x | Nd | 0 | edel | cpk |
| x | x | + | n | n | + | x | dy | 7 | x | Nd | 0 | edel | cpk |
| x | x | + | n | x | + | n | dy | 7 | x | Nd | 0 | edel | cpk |
| x | x | + | x | n | + | n | dy | 7 | x | Nd | 0 | edel | cpk |
| d1 | d0 | n | n | d1 | d0 | n | n | x | x | Bd | 0 | psi1 | cpk |
| − | − | − | − | − | − | − | − | 7 | cpk | Dt0 | 0 | data | pk0 |
| − | − | − | − | − | − | − | − | 7 | pk1 | Dt0 | 0 | data | pk0 |
| − | − | − | − | − | − | − | − | 7 | pk0 | Bd | 0 | err | cpk |
| + | + | + | + | + | + | + | + | 7 | cpk | Dt1 | 0 | data | pk1 |
| + | + | + | + | + | + | + | + | 7 | pk0 | Dt1 | 0 | data | pk1 |
| + | + | + | + | + | + | + | + | 7 | pk1 | Bd | 0 | err | cpk |
| ny | x | + | − | − | − | − | d0 | 7 | pk0 | Dt0 | 0 | kik0 | cpk |
| ny | x | + | − | − | − | − | n0 | 7 | pk0 | Dt0 | 0 | kik0 | cpk |
| ny | x | − | + | + | + | + | d1 | 7 | pk1 | Dt1 | 0 | kik1 | cpk |
| ny | x | − | + | + | + | + | n1 | 7 | pk1 | Dt1 | 0 | kik1 | cpk |
| x | x | x | x | x | x | x | dy | !7 | x | Dty | +1 | data | cpk |
| x | x | x | x | x | x | x | ny | !7 | x | Dty | +1 | data | cpk |
| < | | not above | | | > | | dy | 7 | x | Dty | 0 | data | cpk |
| < | | not above | | | > | | ny | 7 | x | Dty | 0 | data | cpk |

In-Frame Data State Table (data)

FIG. 7

| Inputs | | | | | | | | | Outputs | | |
|---|---|---|---|---|---|---|---|---|---|---|---|
| Shift Register | | | | | | | | CNT IN | DATA OUT | CNT OUT | Next State |
| 0 | 1 | 2 | 3 | 4 | 5 | 6 | 7 | | | | |
| x | x | x | x | x | x | x | d0 | 0-3 | Dt0 | +1 | kik0 |
| x | x | x | x | x | x | x | d1 | 4 | Dt0 | 5 | kik0 |
| x | x | x | x | x | x | x | n | 5-6 | Dt0 | +1 | kik0 |
| x | x | x | x | x | x | x | d1 | 0-3 | Dt0 | +1 | kik0 |
| x | x | x | x | x | x | x | ny | 0-3 | Dt0 | +1 | kik0 |
| x | x | x | x | x | x | x | d0 | 4 | Dt0 | 5 | kik0 |
| x | x | x | x | x | x | x | ny | 4 | Dt0 | 5 | kik0 |
| x | x | x | x | x | x | x | dy | 5-6 | Dt0 | +1 | kik0 |
| – | – | – | – | – | n | n | dy | 7 | Nd | 0 | sdel |
| – | – | – | – | – | n | x | n | 7 | Nd | 0 | sdel |
| – | – | – | – | – | x | n | n | 7 | Nd | 0 | sdel |
| – | – | – | – | – | n | n | n | 7 | Nd | 0 | sdel |
| + | + | + | + | + | n | n | dy | 7 | Nd | 0 | edel |
| + | + | + | + | + | n | x | n | 7 | Nd | 0 | edel |
| + | + | + | + | + | x | n | n | 7 | Nd | 0 | edel |
| + | + | + | + | + | n | n | n | 7 | Nd | 0 | edel |
| d0 | n | n | n | n | d0 | n | n | x | Bd | 0 | psil |
| d1 | d0 | < not above >> | | | | | dy | 7 | Dty | 0 | data |
| d1 | d0 | < not above >> | | | | | ny | 7 | Dty | 0 | data |

Kicker – Zero State Table (kik0)

FIG. 8

FIG. 9 Kicker – One State Table (kikl)

| Inputs | | | | | | | | | Outputs | | |
|---|---|---|---|---|---|---|---|---|---|---|---|
| Shift Register | | | | | | | | CNT IN | DATA OUT | CNT OUT | Next State |
| 0 | 1 | 2 | 3 | 4 | 5 | 6 | 7 | | | | |
| x | x | x | x | x | x | x | dl | 0-3 | Dtl | +1 | kikl |
| x | x | x | x | x | x | x | dO | 4 | Dtl | 5 | kikl |
| x | x | x | x | x | x | x | n | 5-6 | Dtl | +1 | kikl |
| x | x | x | x | x | x | x | dO | 0-3 | Dtl | +1 | kikl |
| x | x | x | x | x | x | x | ny | 0-3 | Dtl | +1 | kikl |
| x | x | x | x | x | x | x | dl | 4 | Dtl | 5 | kikl |
| x | x | x | x | x | x | x | ny | 4 | Dtl | 5 | kikl |
| x | x | x | x | x | x | x | dy | 5-6 | Dtl | +1 | kikl |
| - | - | - | - | - | - | n | dy | 7 | Nd | 0 | sdel |
| - | - | - | - | - | - | x | n | 7 | Nd | 0 | sdel |
| - | - | - | - | - | - | n | n | 7 | Nd | 0 | sdel |
| - | - | - | - | - | x | n | n | 7 | Nd | 0 | sdel |
| + | + | + | + | + | + | n | dy | 7 | Nd | 0 | edel |
| + | + | + | + | + | + | x | n | 7 | Nd | 0 | edel |
| + | + | + | + | + | + | n | n | 7 | Nd | 0 | edel |
| + | + | + | + | + | x | n | n | 7 | Nd | 0 | edel |
| dO | dO | n | n | n | dO | n | n | x | Bd | 0 | psil |
| dl | dO | n | n | <not above> | dO | n | dy | 7 | Dty | 0 | data |
| dl | dO | n | n | <not above> | dO | n | ny | 7 | Dty | 0 | data |

| Inputs | | | | | | | | | Outputs | | |
|---|---|---|---|---|---|---|---|---|---|---|---|
| Shift Register | | | | | | | | CNT IN | DATA OUT | CNT OUT | Next State |
| 0 | 1 | 2 | 3 | 4 | 5 | 6 | 7 | | | | |
| x | x | x | x | x | x | x | ny | 0 | Nd | 1 | edel |
| x | x | x | x | x | x | x | dl | 1 | Dtl | 2 | edel |
| x | x | x | x | x | x | x | ny | 2 | Nd | 3 | edel |
| x | x | x | x | x | x | x | ny | 3 | Nd | 4 | edel |
| x | x | x | x | x | x | x | dl | 4 | Dtl | 5 | edel |
| x | x | x | x | x | x | x | dy | 5 | Dty | 6 | edel |
| x | x | x | x | x | x | x | dy | 6 | Dty | 7 | edel |
| x | x | x | x | x | x | x | d | 0 | Nd | 1 | edel |
| x | x | x | x | x | x | x | dO | 1 | Dtl | 2 | edel |
| x | x | x | x | x | x | x | n | 1 | Dtl | 2 | edel |
| x | x | x | x | x | x | x | d | 2 | Nd | 3 | edel |
| x | x | x | x | x | x | x | d | 3 | Nd | 4 | edel |
| x | x | x | x | x | x | x | dO | 4 | Dtl | 5 | edel |
| x | x | x | x | x | x | x | n | 4 | Dtl | 5 | edel |
| x | x | x | x | x | x | x | n | 5 | Dty | 6 | edel |
| x | x | x | x | x | x | x | n | 6 | Dty | 7 | edel |
| dl | dO | n | n | dl | dO | n | n | !7 | Bd | 0 | psil |
| x | x | x | x | x | — | x | ny | 7 | Si | 0 | psil |
| x | x | x | x | x | — | ny | dy | 7 | Si | 0 | psil |
| x | x | x | x | x | x | dy | dO | 7 | DtO | 1 | prem |
| x | x | x | x | x | x | dy | dl | 7 | Dtl | 0 | ipre |
| x | x | x | x | x | + | x | — | 7 | DtO | 1 | prem |
| x | x | x | x | x | + | x | + | 7 | Dtl | 0 | ipre |

End Delimiter State Table (edel)

FIG. 10

| Inputs | | | | | | | | | | Outputs | | |
|---|---|---|---|---|---|---|---|---|---|---|---|---|
| Shift Register | | | | | | | | Car Lost | CNT IN | DATA OUT | CNT OUT | Next State |
| 0 | 1 | 2 | 3 | 4 | 5 | 6 | 7 | | | | | |
| x | x | x | x | x | x | x | d | — | x | Bdy | +1 | err |
| x | x | x | x | x | x | x | n | — | x | Bdy | +1 | err |
| dl | d0 | n | n | n | dl | d0 | n | ny | 0 | x | Si | 0 | psil |
| ⟨not above⟩ | | | | | | | ny | 0 | x | Bdy | +1 | err |
| ⟨not above⟩ | | | | | | | ny | 0 | x | Bdy | +1 | err |

Error State Table (err)

FIG. 11

SYMBOL DETECTION AND ERROR CORRECTION CODING IN A LOCAL AREA NETWORK

FIELD OF THE INVENTION

This invention relates generally to electrical information communication and particularly to symbol detection and error correction in local area network modems.

BACKGROUND OF THE INVENTION

Until the 1970's computer manufacturers provided only hardware, operating systems software, and, of particular concern here, communication interfaces which operated in accordance with their own proprietary specifications. This was adequate when most computer installations consisted of large central processors performing local batch processing or time sharing.

By the 1980's, however, distributed processing by mini-computers and especially personal computers had become quite popular. Unfortunately, such an architecture made it difficult for users to share data. It quickly became apparent that a way to support high-speed data communication between different types of computers would be needed. This prompted the Institute of Electrical and Electronic Engineers (IEEE) to begin its Project 802, which had the goal of developing a Open Standard Interconnect (OSI) specification. The OSI would enable efficient intercommunication between computers connected in a local area network (LAN), without the need for end users to worry about implementation details that might vary from manufacturer to manufacturer.

Two conclusions were quickly reached by the IEEE. First, because of the diversity of design, getting different computers to communicate is a complex problem. It requires architecture decisions not only at low levels, such as that of the physical wiring and modulation scheme, but also at higher levels, such as the operating-system level. The IEEE thus developed an OSI LAN reference model having three "layers". A first physical layer is concerned with the nature of the transmission medium. A second layer, called the media access control (MAC) layer, specifies the details of signalling along the physical layer. A third layer, the logical link control (LLC) layer, is concerned with establishing, maintaining, and terminating links between devices.

The IEEE's other conclusion was that no single physical layer standard would be appropriate for all applications. In some applications, such as the typical office environment, performance can be sacrificed for lower cost. The IEEE promulgated its 802.3 Standard, also known as Ethernet, as ideal for that application. In more-critical environments, such as that in a factory, the network must be less susceptible to errors. An 802.4 token-passing standard was developed for those applications.

The 802.4 standard places severe restrictions on the allowable bit error rate. For example, it allows only a $10^{-8}$ detected bit error rate with an input signal-to-noise ratio (SNR) of 30db. If this bit-error-rate restriction is violated, the network is expected to shut down. It is theoretically possible to obtain this bit error rate with a 24db SNR, but most implementations to date achieve this bit error rate at only a 27db SNR. Of course, if the bit error rate can be achieved at a lower signal-to-noise ratio, then the network will continue to operate in a noisier environment.

The 802.4 standard also requires the use of amplitude modulated/phase-shift keying (AM/PSK) modulation for transmission over the physical layer. With this modulation scheme, only one of five possible amplitude levels is transmitted at any instant, the five levels being referred to as −4, −2, 0, +2, and +4. The standard also calls for duobinary encoding, in which the five physical signal levels represent three data symbols: {0}, {2}, and {4}. Thus, symbol {4} is transmitted as either a −4 or +4 amplitude level, symbol {2} is transmitted as either −2 or +2 amplitude level, and symbol {0}as amplitude 0.

Symbols {4} and {0} is used primarily to indicate data one and data zero, respectively.

This coding scheme has several known benefits. Since only the {4} and {0} symbols are used during data transmission, a relatively inexpensive asynchronous demodulator can be used at the receiver, with the presence of carrier indicating symbol {4} and the absence of carrier indicating symbol {0}. A benefit of the duobinary modulation is that the phase of the amplitude level used to indicate a {4} symbol can be alternated, thereby minimizing the bandwidth of the resulting radio frequency signal.

The symbol {2} has several functions. As with other communication schemes, data is sent in long sequences in frames of many bytes delimited by control sequences. The symbol {2} is used as a non-data symbol to construct such control sequences. The IEEE 802.4 Standard specifies a frame format and control sequences, generally speaking, as follows:

| psil | prem | sdel | data | edel | prem | sdel | data | ...

where

| | |
|---|---|
| psil | is a "pseudo-silence" sequence used as an idle condition, indicated by repeating the symbols {2}{2}{0}{4}; |
| prem | is a preamble sequence of alternating {0} and {4} symbols used to synchronize the receiver symbol time; |
| sdel | is the frame start delimiter, indicated by the sequence {2}{2}{0}{2}{2}{0}{0}{0}; and |
| data | is the data received, a string of {0} and {4}'s; and |
| edel | is one of several possible frame end delimiters, such as {2}{2}{4}{2}{2}{4}{B}{B}, where the {B}'s are a status information symbol of either {0} or {4}. |

Symbol {2} is also used to avoid long series of symbol {0}'s or {4}'s during data sequences. With an asynchronous receiver, byte synchronization can drift during such long periods without data transitions. The IEEE 802.4 Standard thus requires two consecutive bytes of all {0} or {4}'s to be modified with special sequences that include {2}'s. In particular, the last three bits of the second byte are modified such that the fifth bit is inverted and the sixth and seventh bit are replaced with a {2}. The Standard refers to these substitutions as a "kicker" sequence.

A problem occurs, however, if one attempts to directly implement this signalling scheme with conventional techniques. Since the {2} symbol is represented by an amplitude level midway between a maximum and minimum amplitude, it is more difficult to detect than a {4} or {0}. A typical frame includes a data sequence of a thousand or more symbols, and the entire frame must be re-transmitted if an error occurs in the detection of the frame-delimiting {2}symbol.

Thus, an error in detecting a {2} can have a significant impact on the bit error rate. For example, if the allowable bit error rate is $10^{-8}$, but data frames are about a thousand symbols long, the effective bit error rate seen by the LLC level is about one thousand times worse, or $10^{-5}$, if these errors occur in detecting a {2}.

It thus would be advantageous for received symbols to be corrected. Correction of certain symbols, especially those symbols used for control information, would have maximum impact since the need to retransmit entire frames would thereby be eliminated. Also, it is desirable for this correction to occur at the physical layer; burdening of the upper layers with the details of symbol correction would thereby be avoided.

SUMMARY OF THE INVENTION

It is among the objects of this invention to decrease the received symbol error rate as perceived by upper layers of a communication protocol such as the media access control layer of the IEEE 802.4 protocol.

Generally speaking, in accordance with the invention, a received signal is fed to pair of slicers. One slicer operates as a binary two-symbol decoder, with a single threshold located midway between a maximum amplitude level and a minimum amplitude level. The maximum amplitude level normally indicates a symbol {4}, and the minimum level a symbol {0}. A second slicer operates as a three-symbol decoder using a pair of threshold levels. A receiver state machine keeps track of the receiver context to determine which portion of a frame is currently expected to be received. Depending upon the current context, one or both of the slicer outputs are used by the state machine to determine which of the three symbols was received.

More particularly, an embodiment of the invention particularly useful for IEEE 802.4 signalling operates in several ways, depending upon the portion of a frame currently being received.

There are several advantages to this invention. By using the detection and correction techniques described, the bit error rate as perceived by the upper protocol layers can be significantly reduced. For example, a $10^{-8}$ bit error rate can be achieved with an envelope detector having a 22db or so input SNR. The algorithms can also be used to improve the bit error rate with other detection schemes, such as synchronous detection. As a result of these error correction algorithms, a local area network can continue to operate in harsh conditions which would otherwise force the network to shut down.

The methods used are simple and relatively straightforward to implement with known digital-circuit technology, and thus lends themselves to fabrication with only a small amount of logic.

BRIEF DESCRIPTION OF THE DRAWINGS

The above and further advantages of the invention may be better understood by referring to the following description in conjunction with the accompanying drawings, in which.

DETAILED DESCRIPTION OF AN ILLUSTRATIVE EMBODIMENT

Figure 1:
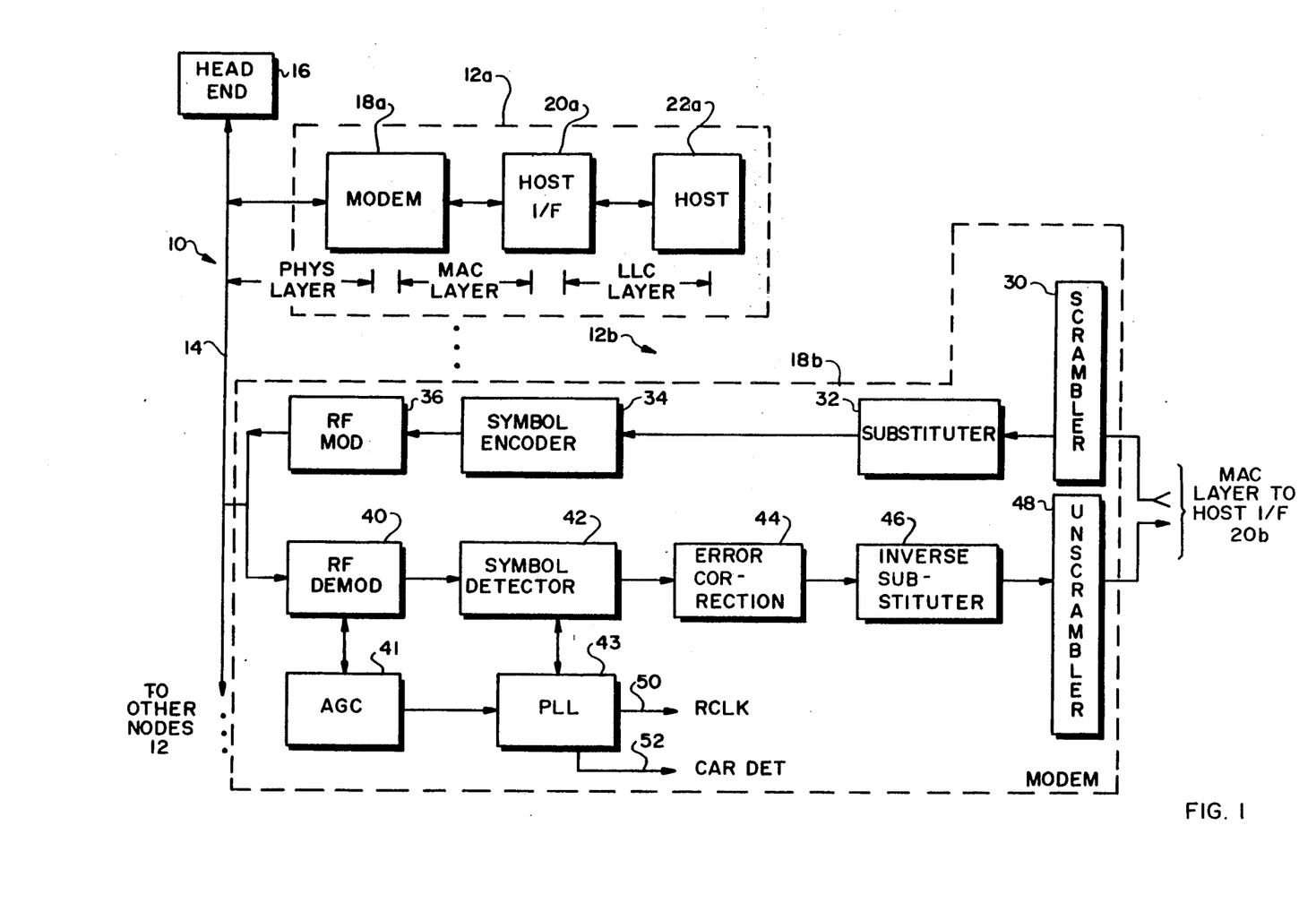
FIG. 1 is a block diagram of a local area network using a modem constructed in a accordance with this invention.

FIG. 1 is a block diagram of an IEEE 802.4 local area network (LAN) 10 in which the invention may be used to decrease the bit error rate. Network node 12a, node 12b, and other nodes not shown (collectively, nodes 12) communicate with one another over a broadband transmission medium such as a coaxial cable 14. LAN 10 also includes a head end remodulator 16 which receives and detects the signals transmitted by a sending node 12 and reconstructs and retransmits these signals before they are received by another, destination node 12.

From the point of view of LAN 10, the functions of the data processing equipment located at an exemplary node 12a are generally divided into a modem 18a, host interface 20a, and host computer 22a. LAN equipment manufactures typically sell the modem 18a together with a customized host interface 20a for a particular host computer, such as the International Business Machines Personal Computer (IBM PC).

The various layers of the IEEE 802.4 standard LAN reference model are also indicated in FIG. 1. These include the interface between the medium 14 and modem 18a, or physical layer; the interface between the modem 18a and the host interface 20a, or media access control (MAC) layer; and the interface between the host interface 20a and the host 22a, or logical link control (LLC) layer.

FIG. 1 further includes a block diagram of an exemplary IEEE 802.4 modem, namely, the modem 18b portion of node 12b, which uses the invention. Modem 18b includes conventional IEEE 802.4 transmitter components such as a scrambler 30, substituter 32, symbol encoder 34, and modulator 36. The transmitter components operate conventionally in accordance with the IEEE 802.4 standard. For example, the scrambler 30 makes random substitutions, such as by modulo-two polynomial division, in the data received from the host interface 20b, so that the transmitted signal will have randomized spectral components. The scrambler 30 does not completely eliminate long sequences of data ones and data zeros, so the substituter (also called a kicker) 32 is still needed to insure that two consecutive bytes of all {0} or {4}'s are modified with special sequences that include {2}'s. In particular, the last three bits of the second byte are modified such that the fifth bit is inverted and the sixth and seventh bit are replaced with a {2}. Encoder 34 adds the required mentioned in the Background section, and AM/PSK modulator 36 modulates the result.

Modem 18b also has conventional IEEE 802.4 receiver components such as an AM/PSK demodulator 40, an automatic gain control circuit (AGC) 41, a phase-locked loop (PLL) 43, and an unscrambler 48. AGC 41 adjusts the gain of the demodulator 40. PLL 43 provides a receiver clock signal (RCLK) 50 and a carrier-detect signal (CAR DGT) 52. Unscrambler 48 reverses the operation that the scrambler 30 performed the transmitter.

The symbol decoder 42, error correction 44, and inverse substituter 46 portions of the receiver, however, operate in a novel way in accordance with the invention to improve the bit error rate of the modem 18b.

While some error detection and correction techniques are meant to be used at other layers, the invention operates on symbols as they are received at the physical layer by the modem 18a. The IEEE 802.4 standard specifies that the physical layer operates with three symbols, a data one, or {4} symbol, a data zero, or {0} symbol, and a non-data control symbol, {2}. While some detection and correction schemes operate by correcting the data symbols {4} and {0}, the invention is primarily concerned with improving the bit error rate over the physical layer by improving detection of the non-data symbol {2}.

Figure 2:
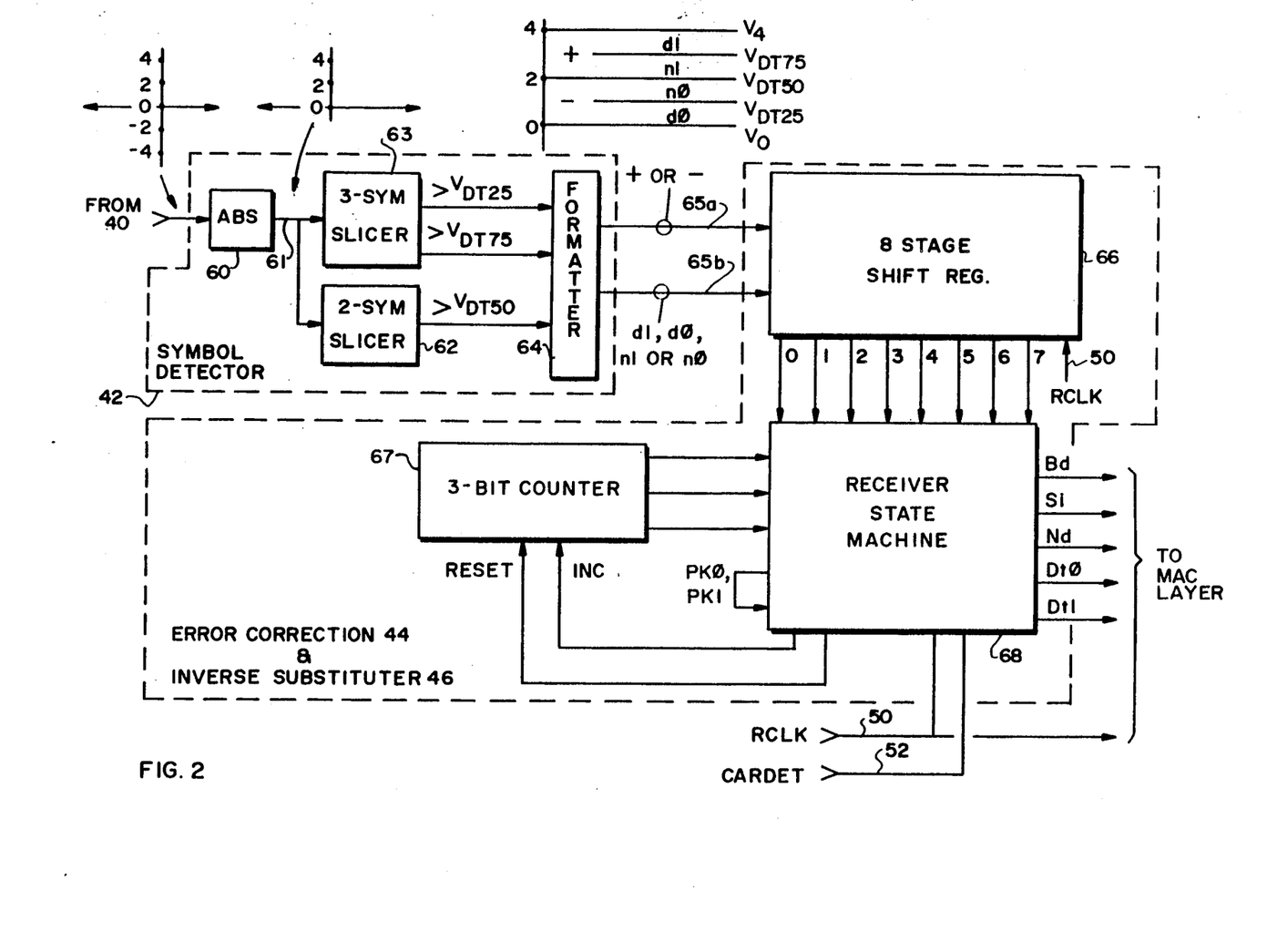
FIG. 2 shows portions of the modem of FIG. 1 in greater detail.

This can be better understood by referring to FIG. 2, where it is seen that the symbol decoder 42 includes an absolute-value circuit 60, a two-symbol slicer 62, a three-symbol slicer 63, and a formatter 64. Absolute value circuit 60 operates on the output of demodulator 40, which is a baseband bipolar digital signal having one of five possible amplitude levels. The five possible levels are referred to in the IEEE 802.4 standard as +4, +2, 0, −2, and −4. Because of the duobinary signalling, only the amplitude information, and not the phase information (ie., the sign) is necessary to determine which one of the three possible symbols {0}, {2}, or {4} is being received.

A rectified signal 61 is thus output from the absolute value circuit 60 and passed to both the two-symbol slicer 62 and three-symbol slicer 63. Two-symbol slicer 62 determines whether the amplitude level of rectified signal 61 is greater than a single reference detection threshold voltage, $V_{dt50}$. $V_{dt50}$ is a voltage approximately midway between the nominal amplitude level, $V_4$, which indicates a symbol {4} and the nominal amplitude level, $V_0$, which indicates a symbol {0}.

Three-symbol slicer 63 performs two comparison operations. The first operation determines whether the level of rectified signal 61 is greater than a reference voltage $V_{dt25}$ a voltage between $V_0$ and $V_{dt50}$. The second comparison, operating in parallel with the first, determines whether the level of rectified signal 61 is greater that another reference voltage, $V_{dt75}$, which is a voltage between $V_4$ and $V_{dt50}$ $V_{dt25}$ may or may not be exactly half-way between $V_0$ and $V_{dt50}$; $V_{dt75}$ may or may not be exactly half-way between $V_{dt50}$ and $V_{dt4}$.

A formatter 64 then can be used to encode the outputs of two-symbol slicer 62 and three-symbol slicer 63, to provide an indication of which of the three symbols was detected. For a given single symbol received from the demodulator 40, formatter 64 outputs two detected signals 65a and 65b. The first signal 65a depends on the result of the decision made by two-symbol slicer 62, which will be either the signal "+", indicating that two-symbol slicer 62 has determined the level of rectified signal 61 to be above $V_{dt50}$, or the signal "−", which indicates that two-symbol slicer 62 has determined it to be below $V_{dt50}$. It should be understood that formatter 64 is not a necessary part of the invention, as any method of communicating which symbol was received by each of the slicers will be sufficient.

The second detected output signal 65b depends upon the operations of both slicers 62 and 63. A d1 value of output 65b indicates the received level of rectified signal 61 was above $V_{dt75}$. A d0 value indicates that the level was below $V_{dt25}$, an n1 value indicates that the level was above $V_{dt50}$ but below $V_{dt75}$, and an n0 level indicates the level was below $V_{dt50}$ but above $V_{dt25}$. Thus, d0 and d1 indicate receipt of a {0} and {4}, respectively. Signals n0 and n1 both indicate a symbol {2} was received, with n0 meaning the amplitude was on the low side and n1 meaning that the amplitude was on the high side.

Signals 65a and 65b output from formatter 64 are then fed to an eight-stage shift register 66, a counter 67, and a receiver state machine 68, which collectively perform the functions of the error-correction circuit 44 and inverse substituter 46. The shift register 66 receives the signals 65a and 65b and retains them for eight cycles of the receiver clock 50 for use by the state machine 68. The counter 67 is used by state machine 68 to keep track of which symbol of a byte is currently being received.

State machine 68 operates on the outputs of the counter 67 and, shift register 66, the receiver clock signal 50, the carrier lost signal 52, and to perform the functions of the error-correction 44 and inverse substituter 46 of modem 18b. Its output signals conveys the currently received symbol and other information to the MAC layer, as defined in the IEEE 802.4 standard, as follows:

| | |
|---|---|
| Bd | asserted when the modem can not determine what symbol was received, such as during a carrier loss or when the modem has detected data corruption; |
| Dt0 | a data symbol one, i.e., {0}, was detected; |
| Dt1 | a data symbol zero, i.e., {4}, was detected; |
| Nd | a non-data symbol, i.e., {2}, was detected; and |
| Si | silence is being received from the head end. |

This information is encoded into the RXSYM0-3 signal levels defined by the IEEE 802.4 standard by a suitable encoder circuit (not shown) before it is actually sent over the MAC layer interface.

Figure 3:
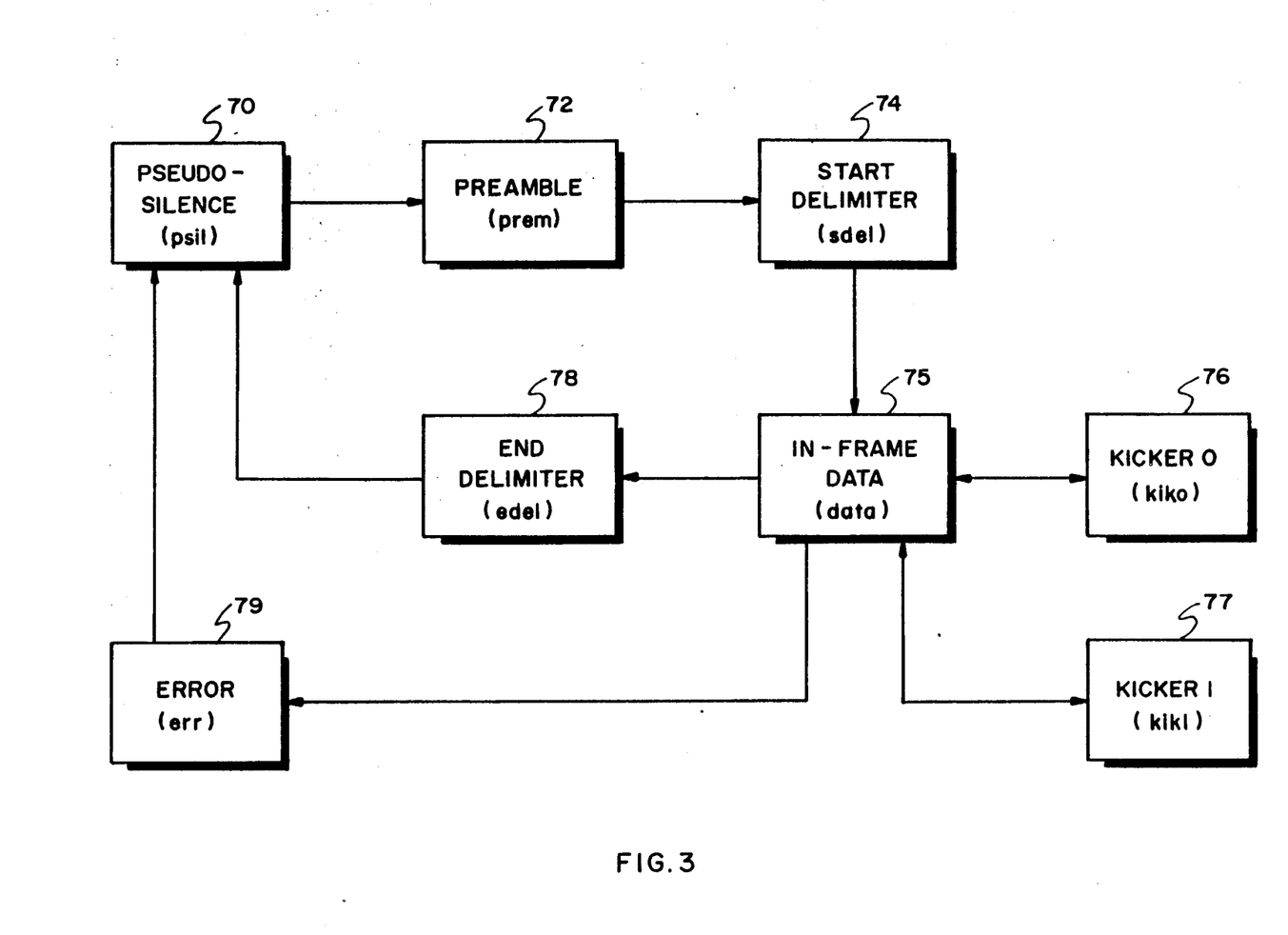
FIG. 3 is a generalized, high-level state diagram showing the states assumed by the state machine depicted in FIG. 2 during reception of a typical frame.

FIG. 3 is a simplified state flow-diagram showing the sequence of states assumed by state machine 68 during reception of a normal sequence of symbols without errors. The names of the states correspond to the last known valid symbol sequence received. State machine 68 assumes and remains in a pseudo-silence state 70 while the pseudo-silence (i.e., idle) sequence {2}{2}{0}{4} is being received. Pseudo-silence state 70 is an artificial silence state functionally equivalent to having received no data, but where the head end 16 sends a sequence anyway to pass clocking information. During the pseudo-silence state 70 the primary task of the state machine 68 is to look for a preamble sequence of alternating {0} and {4} symbols. When that sequence is detected, a preamble state 72 is assumed.

In that preamble state 72, the state machine 68 primarily looks for a start delimiter sequence, {2}{2}{0}{2}{2}{0}{0}{0} and then enters start-delimiter state 74 once that sequence has been detected. In the start delimiter state 74, the state machine primarily waits for the next eight symbols to fill the shift register 66, whereupon it assumes an in-frame data state 75.

An in-frame data state 75, the state machine primarily detects and reports errors in the received data symbols and determines whether the inverse substitution, or kicker, function may need to operate. The kicker-zero state 76 and kicker-one state 77 actually perform the substitution if it's needed. Finally, when an end delimiter is detected in the in-frame data state 75, end delimiter state 78 is assumed, in which the state machine searches for either an interframe preamble or a pseudo-silence sequence.

If carrier is lost from the head end 16, the state machine assumes this state, in which it searches for a proper pseudo-silence sequence.

Most of the states also look for pseudo-silence, preamble, start delimiter, end delimiter sequences, and carrier loss, and assume the proper next state if detected, but FIG. 3 does not depict these functions. These are evident from examination of the detailed state tables in FIGS. 4 through 11.

The general operating philosophy of the error-correction portion 44 of state machine 68 is to correct symbols whenever possible. When noise is present, the most likely bit error is that a physical symbol {0} or {4} will be incorrectly received as a {2}, or that as {2} will be received as a {4} or {0}. This has the result that if a {2} is received as a {0} or {4}, a frame delimiter can be missed; or if a {4} or {0} is changed into a {2}, a frame will no longer be correct. Either type of error requires retransmission of the entire current frame in order to recover, severely impacting the throughput rate as seen at the MAC layer. Thus, the use of an error correcting algorithm in accordance with the invention greatly improves the throughput rate when noise is present.

FIGS. 4 through 11 are detailed state tables for the states of state machine 68. In these figures, inputs from the shift register 66 and counter 67 (FIG. 2) are shown to the left, and outputs to the right. Shift register position 0 is the most recently received symbol from formatter 64; position 1 the symbol received during the previous last receiver clock 50 cycle; and so forth.

The "x" entries in the shift register columns mean that the state machine 68 doesn't care about the state of that shift register position; the "+", "−", "d0", "d1", "n0", and "n1" entries means that those signals, originating from formatter 64 as previously defined, were stored in the indicated shift register positions; "d" and is a "d1" or "d0"; "n" an "n1" or "n0", and "ny" and "dy" mean the same as "n" and "d", respectively.

The CNT IN column refers to the state of the modulo-8 counter 67. The entry 0,4 means the indicated state (psil, govern, etc) will be assumed if either a 0 or a 4 is received from the counter, an "x" indicates that the counter state does not matter, and a 7! means that the indicated state will be assumed if the counter is not equal to seven (as long as the other input conditions for that state are met as well, of course).

The Si, Dt0, Dt1, Nd, and Bd entries on the output side are as previously described. "Dty" means that either Dt0 or Dt1 is output, depending upon the "y" in the "dy" or the "ny" in the shift register position so indicated. For example, in the last entry of the Start Delimiter State Table of FIG. 7, the "ny" on the input side and "Dty" on the output side mean that Dt0 is output if the shift register input stage 7 had "n0", and Dt1 is output if it had an "n1".

The counter output is usually either +1, indicating the counter is to be incremented, or 0, that it is to be cleared. In some instances, the next count contents are specified directly.

The next-state output indicates the state that state machine 68 assumes next.

While the state tables in FIGS. 4 through 11 are self-explanatory to those of skill in the art and verbal description of every possible state in detail is not necessary, certain things can be said about each state to further explain the detection and correction technique of this invention.

Figure 4:
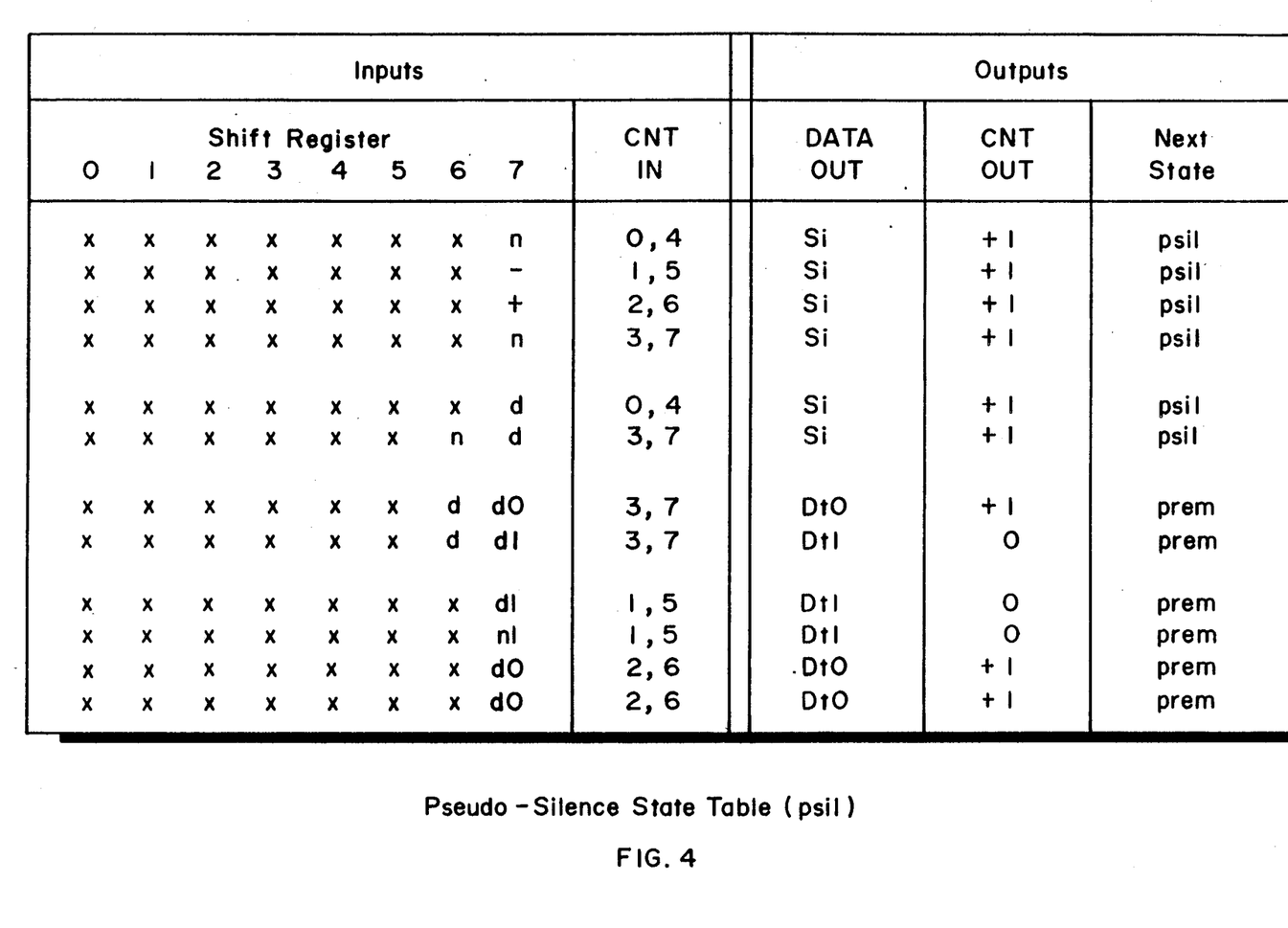
FIGS. 4 through 11 are detailed state tables showing the operation of the state machine in each of the states in FIG. 3.

From the first four state entries of FIG. 4, it is evident that pseudo-silence state, once reached, is rational so long as the pseudo-silence sequence {2}{2}{0}{4} is repeated. The symbols {0} and {4} are detected using the two-symbol slicer 62 (evident from the use of the + and − inputs, rather than the d0 and d1 inputs). From the fifth and sixth entries, it is evident that pseudo-silence is retained even if the first {2} is erroneously detected as a data symbol, or if the second {2} is erroneously detected and the first was correct. The remaining entries illustrate that preamble state will be assumed next if two data symbols are detected where the two {2}'s are supposed to be, a {4} or {2} where a {0} is expected, or a {0} or {2} where a {4} is expected.

Figure 5A:
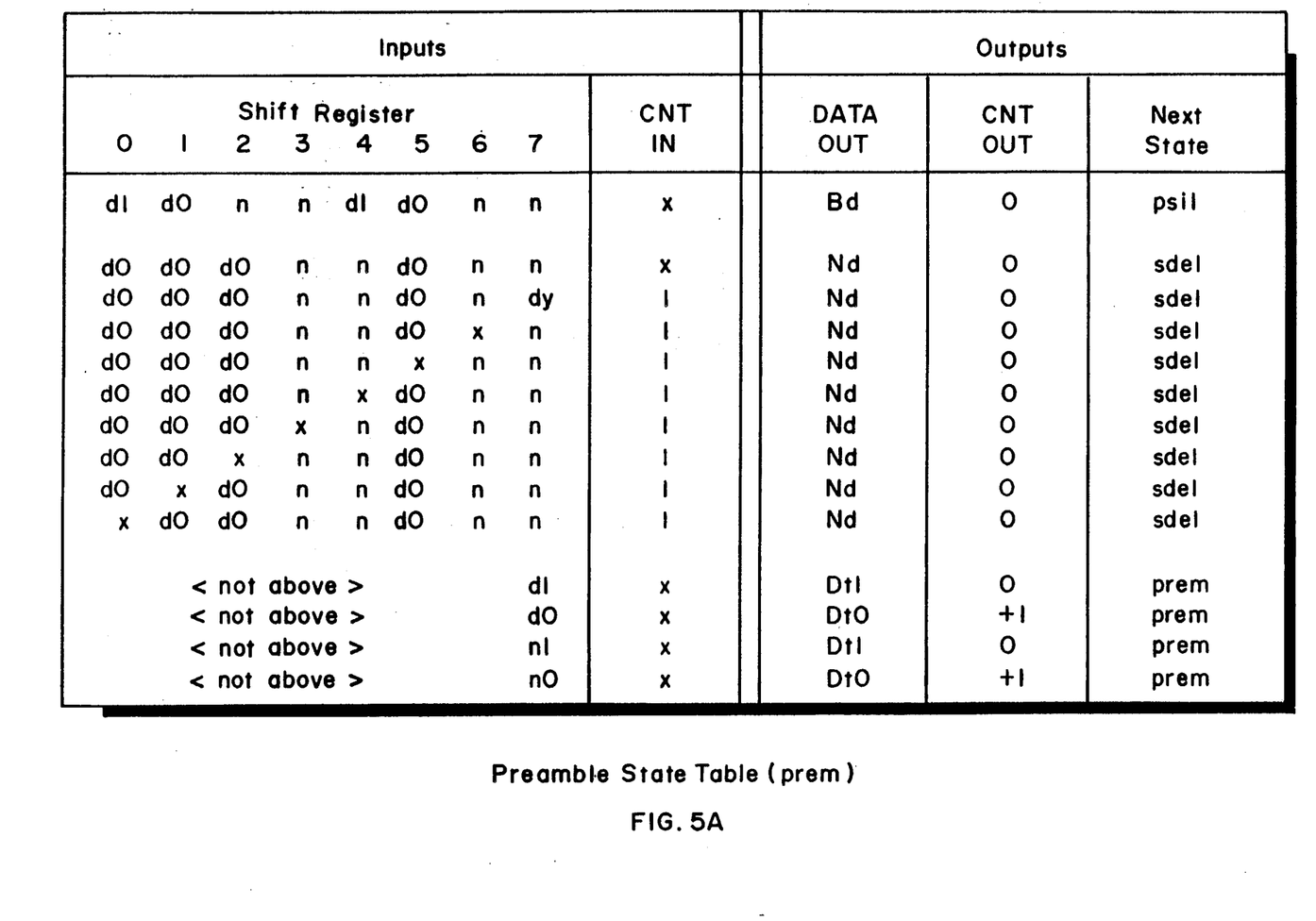

FIG. 5A represents the states entered during a post-silence preamble state. The first entry of FIG. 5A indicates that the state machine returns to this state when the pseudo-silence sequence is detected. The final four entries illustrate that preamble state is maintained as long as either the two-symbol slicer 62 or the three-symbol slicer 63 outputs indicate the repeating {0} {4} sequence which is preamble (because there are both d1 and d0 entries, as well as n0 and n1 entries). The counter outputs insure that the received symbols will be byte aligned when the proper start delimiter sequence is received. The remaining nine states in this table indicate that the state machine 68 will cause the start delimiter state, without reporting an error to the MAC layer, even if there is a single symbol error in the detection of start delimiter sequence, {2}{2}{0}{2}{2}{0}{0}{0}.

Figure 5B:
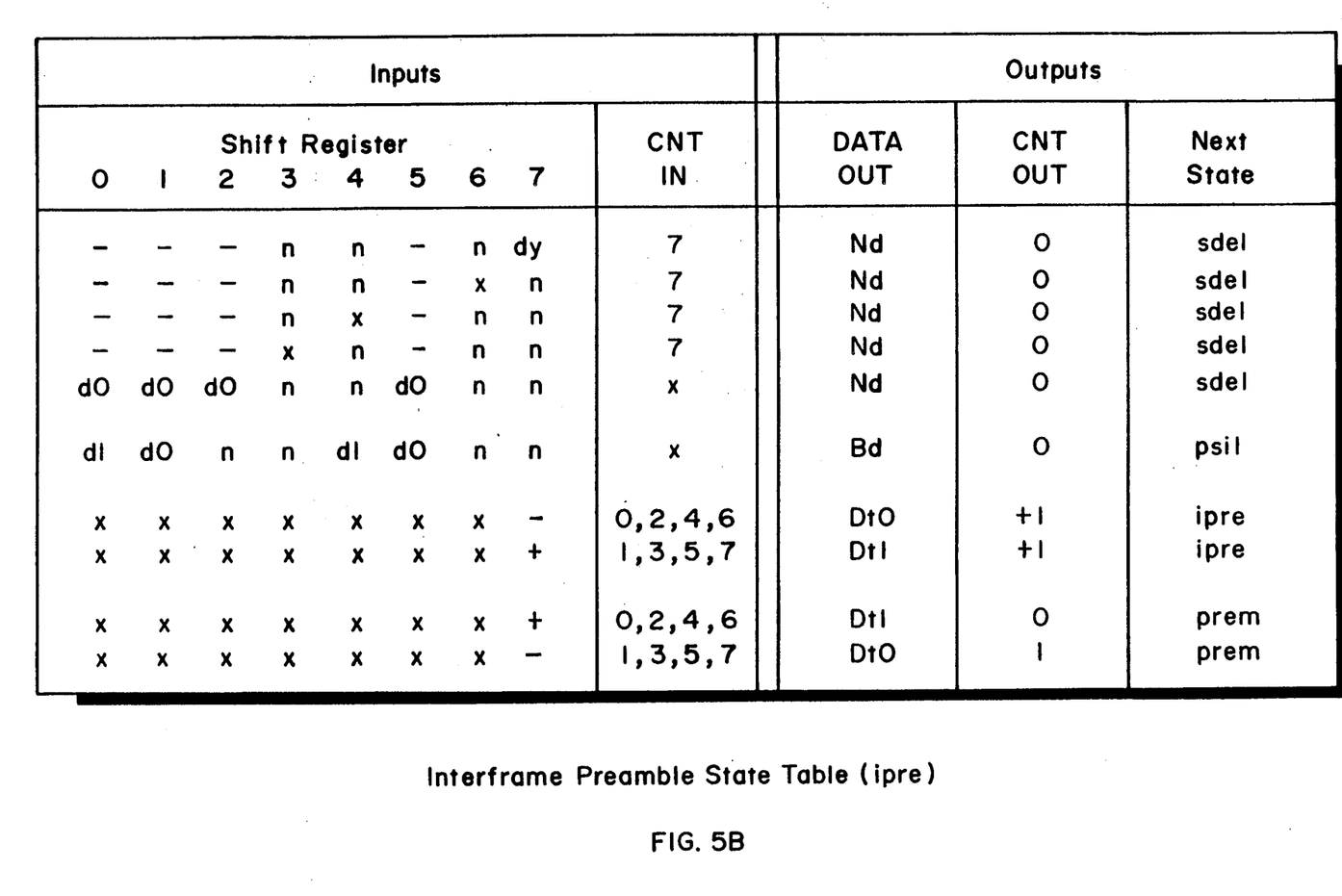

FIG. 5B represents the states entered when an interframe preamble is encountered. Here, detection of start delimiter occurs with more freedom since it is expected that the receiver is already byte-aligned. If pseudo-silence is detected when not expected, bad data is reported, and pseudo-silence state is entered. If bit alignment, is lost, the post-silence preamble state is entered.

Figure 6:
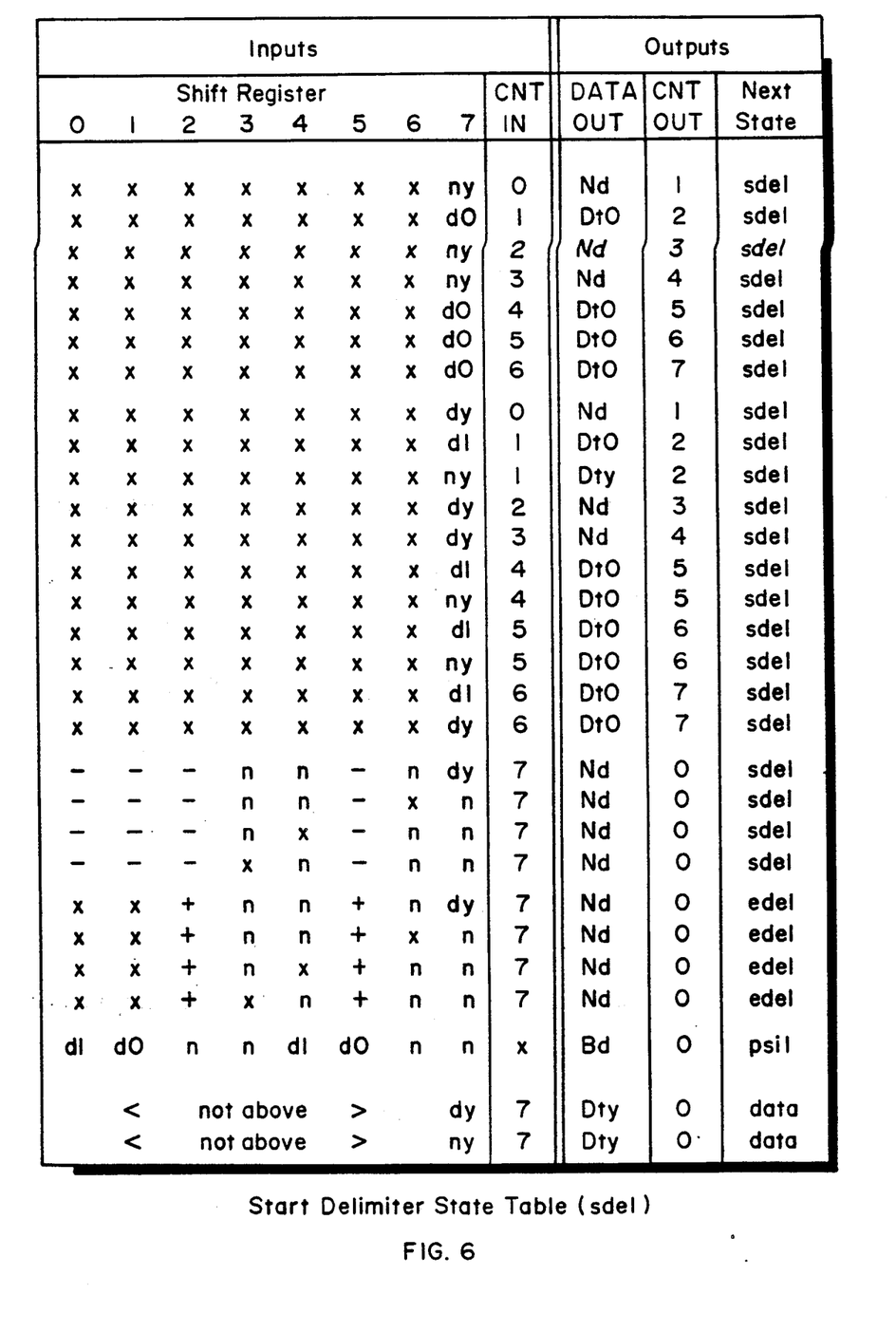

FIG. 6 is the start delimiter state table. The first eighteen entries are basically wait states to allow seven more symbols to fill the shift register 66. They also force a number of data zeros when data is first being received, as required by the standard. The next four states indicate that if another start delimiter has now been received, then start delimiter state is not left. This start delimiter can be detected even if there is an error in the detection of one symbol {2}. The next four states perform a similar function for the end delimiter. The next entry indicates that if pseudo-silence is detected, then pseudo-silence state will be entered. The final two entries mean that if none of these conditions are satisfied, then data must be being received, and control passes to the in-frame data state.

Figure 7:
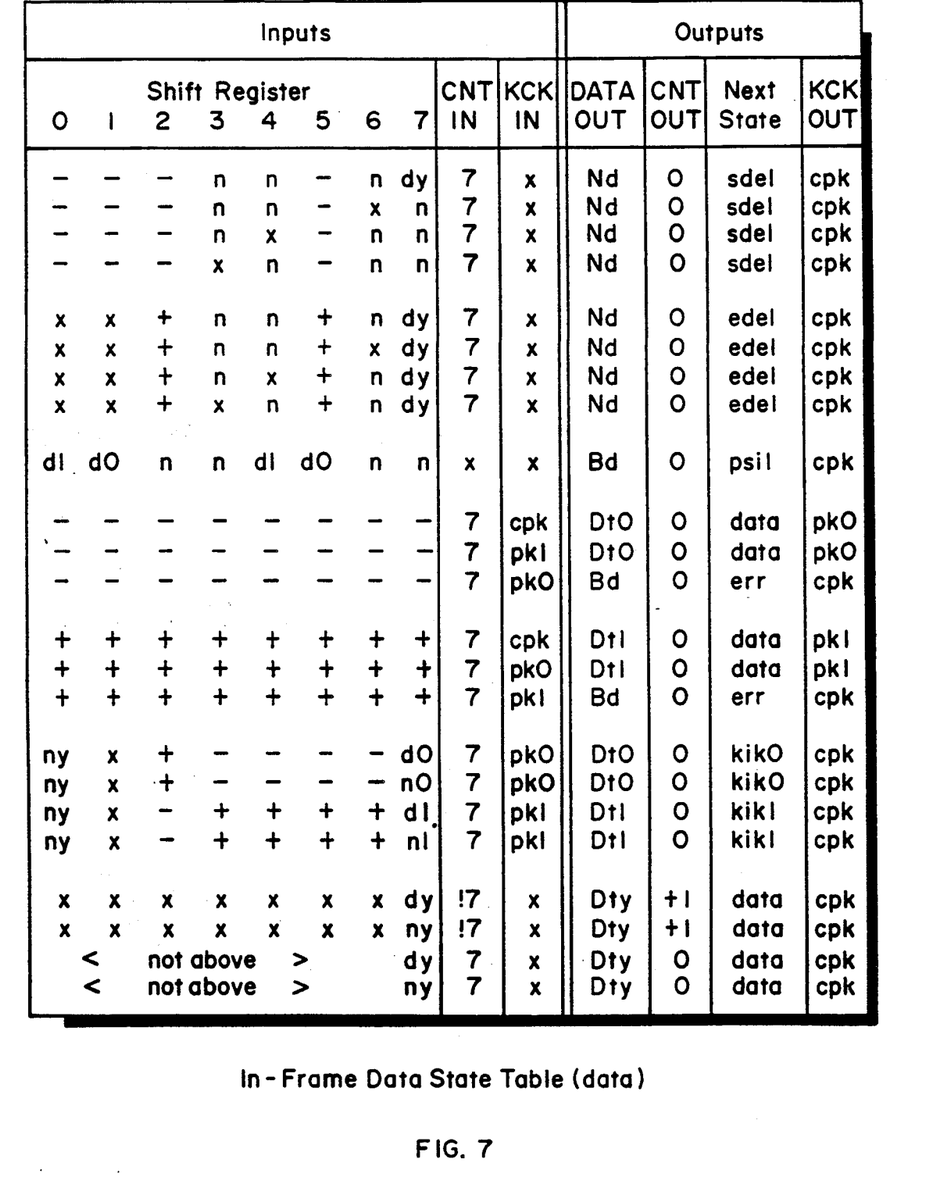

The in-frame data state table is in FIG. 7. The state machine looks for start delimiter in this state and will jump to that state even if an error in detection of a {2} occurs. It similarly looks for end delimiter, and jumps to pseudo-silence state if it detects that sequence with no errors.

In this state the state machine also looks for potential kicker sequences which need to be changed, and it enters the kicker states if it finds such sequences. For example, if a sequence of eight {0}'s is detected, the state machine generates a dt0 signal and a potential-kicker signal, pk0. It similarly generates a pk1 signal if it detects a sequence of eight {1}'s. (The pk0 and pk1 signals are internal to the state machine 68 and are not conveyed to the MAC layer). Then, when the next eight received symbols have the kicker substitution (i.e., an inverted symbol and two symbol {2}'s) and pk0 or pk1 is asserted, control passes to the appropriate kicker correction state. The "cpk" output means that in-frame data 75 will clear both pk0 and pk1 before transferring to any other state.

The two last entries in FIG. 7 indicate that the two-symbol slicer 62 is used to determine which symbol was sent.

Figure 8:
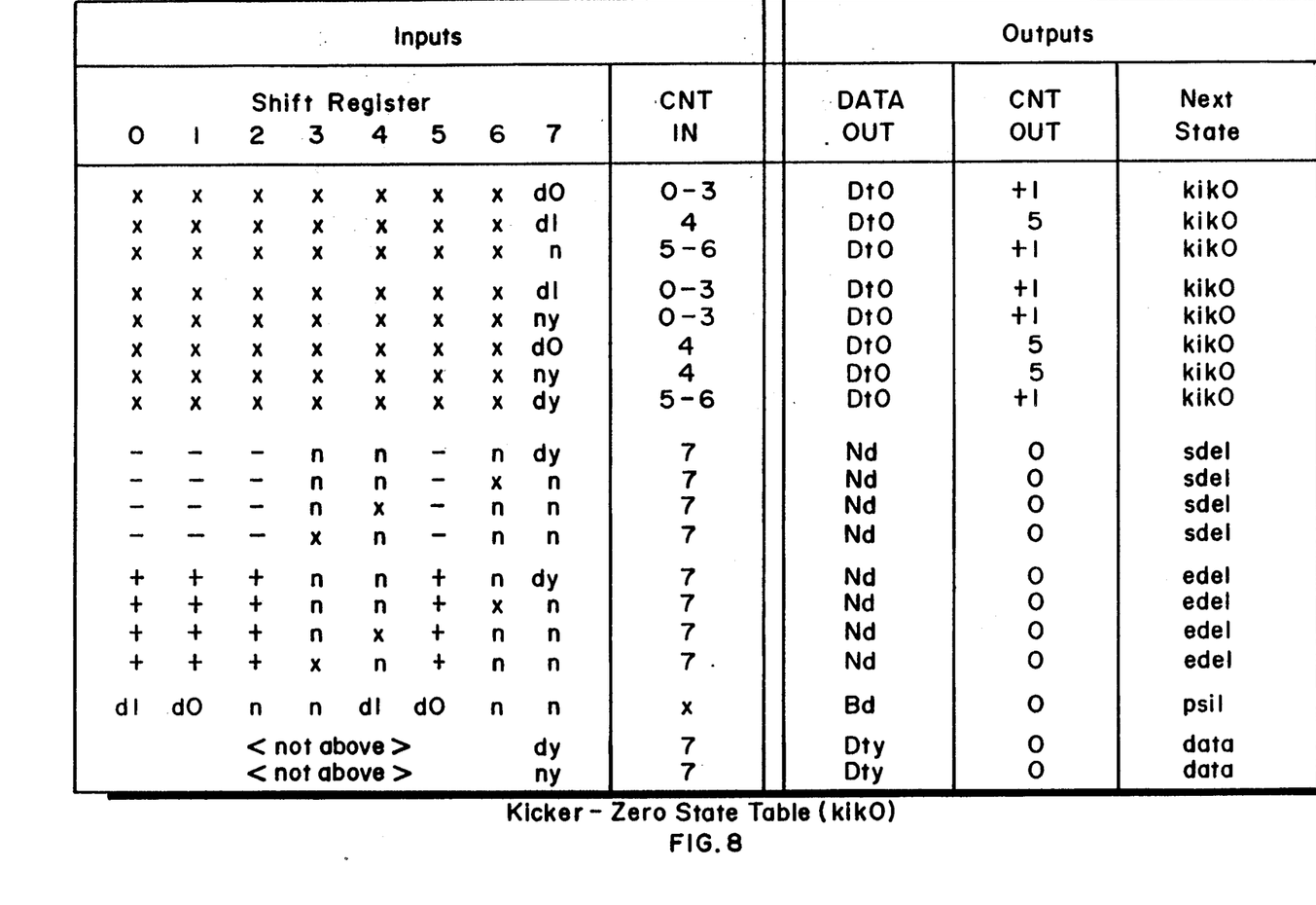
Figure 9:
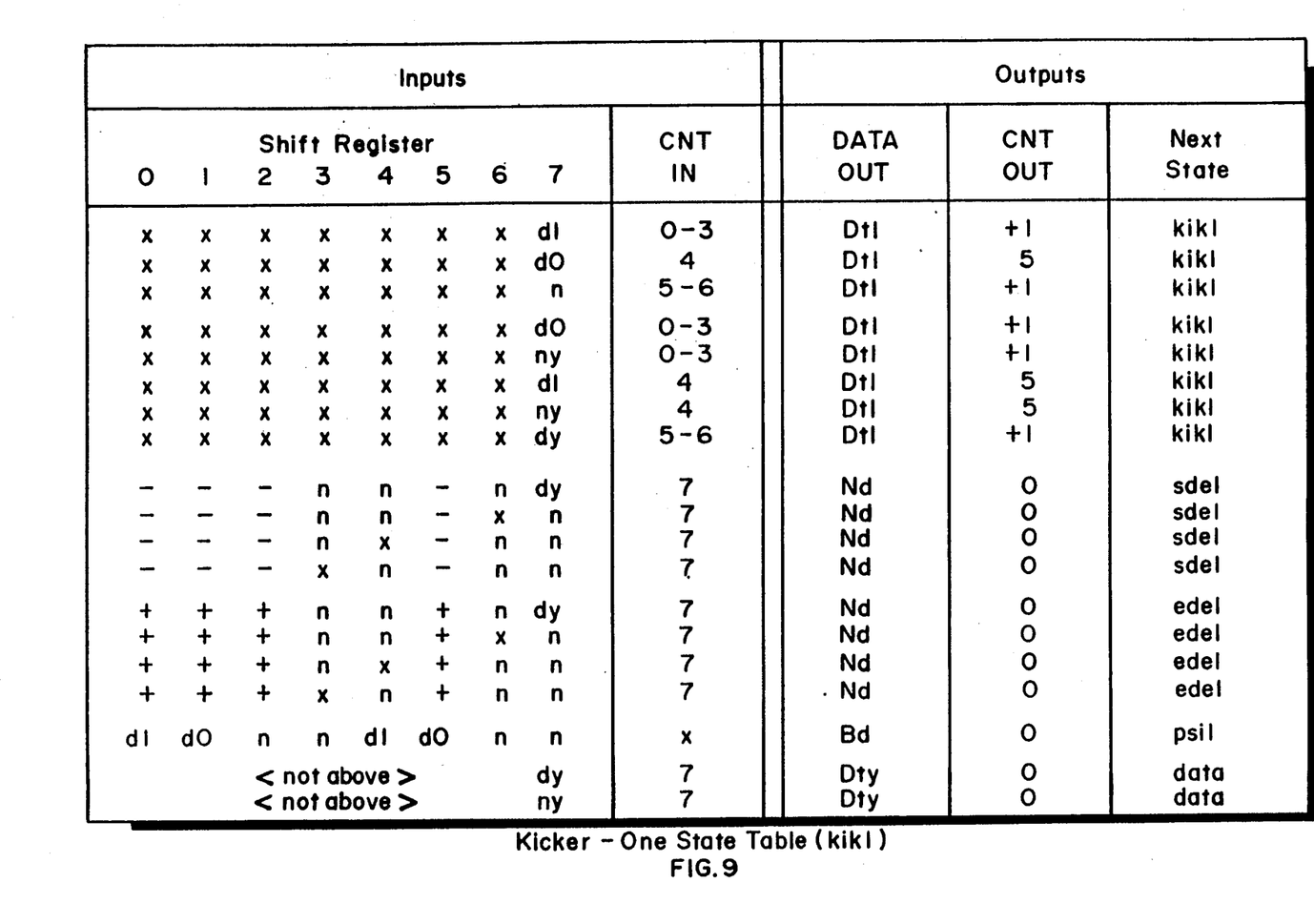

FIGS. 8 and 9 show the kicker correction state tables which correct kicker substitutions in accordance with the standard. The kicker substitution occurs when a transmitter sends a sequence of sixteen {4} or {0} symbols in a row, by encoding a symbol inversion and pair of {2}'s in a symbol positions 5-7 of the second byte.

Figure 10:
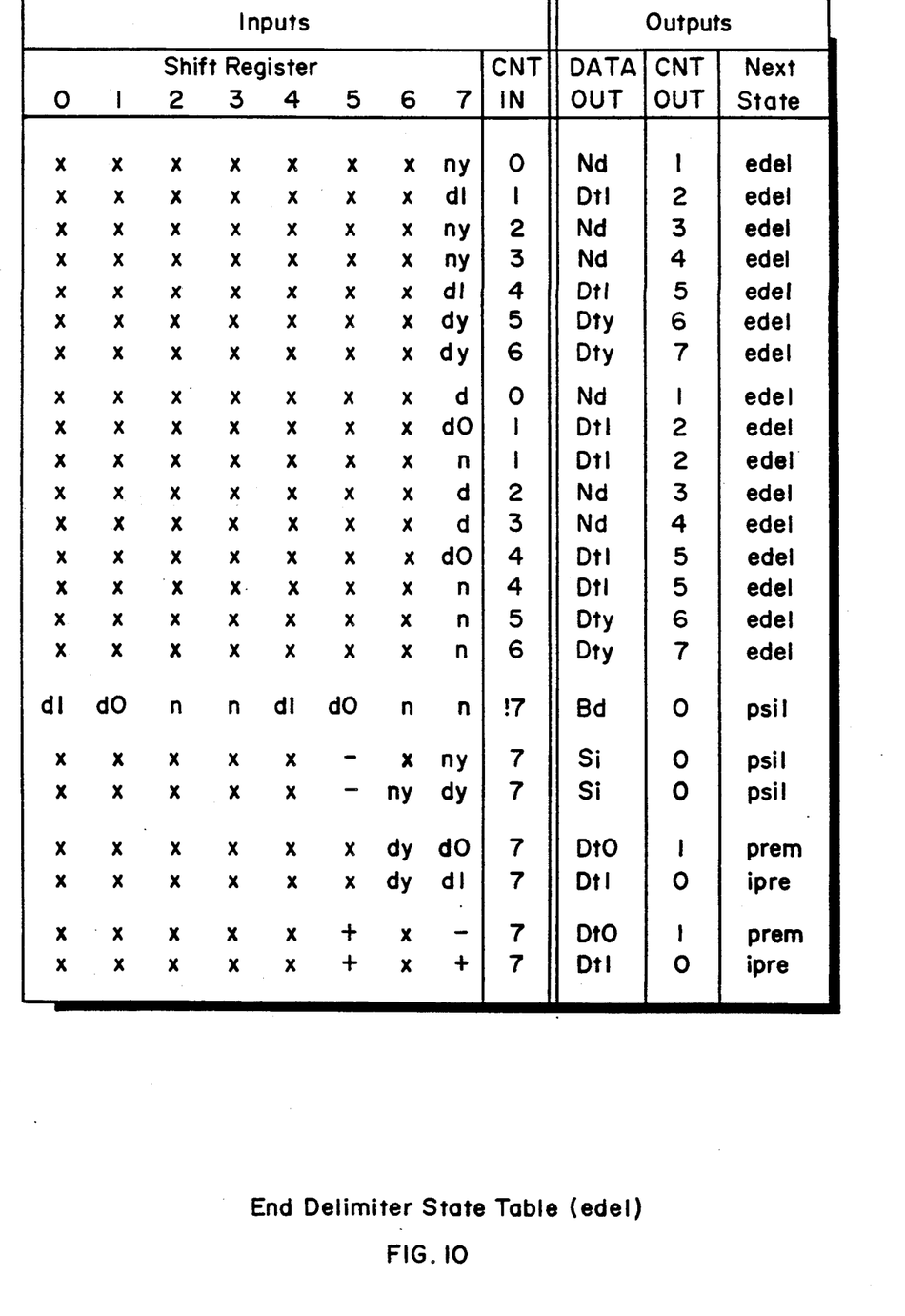

FIG. 10 shows the end delimiter state table, which is similar to the start delimiter table, but passes control to the preamble or pseudo-silence state as appropriate.

Figure 11:
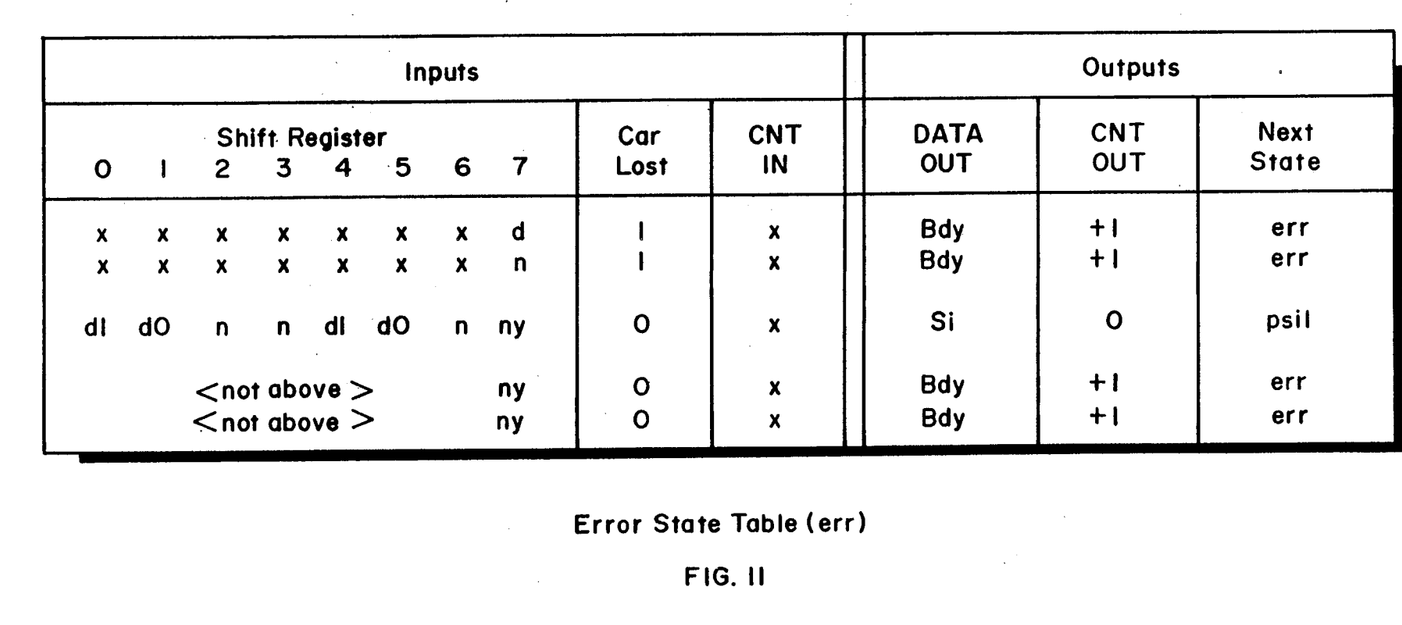

FIG. 11 is the error state table. Assertion of the carrier lost signal 52 force state machine 68 to this state, to wait for a pseudo-silence sequence. The error state is the mechanism for ensuring that at least two pseudo-silence sequences are correctly received after carrier loss, with no errors, before allowing the state machine 68 to continue.

The foregoing description has been limited to a specific embodiment of this invention. It will be apparent, however, that variations and modifications may be made to the invention, with the attainment of some or all of the advantages of the invention.

Although the description has been of a LAN modem, the techniques are also directly applicable to LAN head end remodulators as well.

Additionally, the techniques are directly adaptable to improve the bit error rates of other LAN protocols, radio communication, other modulation schemes, etc., as long as they use three symbol signalling, with one of the levels used primarily to indicate control information.

It is the object of the appended claims to cover all such variations and modifications as come within the true spirit and scope of the invention.

I claim:

1. A method for determining if a start delimiter sequence is correctly being received, the method for use in a communications system which receives an input signal that contains signalling sequences formatted into frames, the frames having both control and data information contained therein, the control information sequences including a silence sequence indicating that no data is being received, and a start delimiter sequence meant to indicate the beginning of a data sequence, the start delimiter including a series of symbols, the method comprising the steps of:
   A. when a post-silence preamble has been received most recently, allowing only one symbol error in the detection of a start delimiter before reporting an error; and
   B. when an interframe preamble has been received most recently, allowing more than one symbol error in the detection of a start delimiter before reporting an error.

2. A method of operating a local area network modem receiver to report errors to an upper level, the receiver for receiving symbol frames which include sequences of symbols, the sequences including a pseudo-silence sequence, a preamble sequence, a start delimiter sequence, a data sequence, and an end delimiter sequence, the error-reporting method comprising the steps of:
   A. when a pseudo-silence sequence is expected, accepting as many as one received symbol error for every four received symbols without reporting an error to the upper level; and
   B. when a start delimiter sequence is expected, accepting one symbol error per start delimiter sequence without reporting an error to the upper level.

3. In a receiver for use in a communications system which receives an input signal, the input signal one of three possible symbols at any one point in time, the three symbols including two data symbols and a non-data symbol, the input signal also containing signalling sequences formatted into frames, the frames having both control and data information contained therein, at least one of the control information sequences being a pseudo-silence sequence meant to indicate to the receiver that no data is being transmitted, the pseudo-silence sequence being indicated by sending a series of symbols, at least two of which are non-data symbols, a method for determining that a pseudo-silence sequence is being correctly received comprising the steps of:
   A. when the pseudo-silence sequence is not expected, requiring correct reception of at least two consecutive pseudo-silence sequences; and
   B. when the pseudo-silence sequence is expected, allowing at least one symbol error in the detection of the non-data symbols per pseudo-silence sequence.

4. A method as in claim 3 wherein a proper pseudo-silence sequence includes at least two consecutive non-data symbols, and further comprising:
   C. when the pseudo-silence sequence is expected, allowing at least one symbol error per pair of non-data symbols before reporting an error.

5. A method as in claim 3 wherein a lower-amplitude level and an upper-amplitude level represent the two data symbols, and a mid-amplitude level represents the non-data symbol, the method further comprising:
   D. when the pseudo-silence sequence is expected, using a two-level slicer to detect the data symbol portions of the pseudo-silence sequence.

6. In a receiver for use in a communications system which receives an input signal, the input signal using duobinary signalling and thus containing one of three possible symbols at any point in time, the symbols including two data symbols and a non-data symbol, the input signal also containing signalling sequences formatted into frames, the frames having both control and data information contained therein, the control information sequences including a silence sequence meant to indicate to the receiver that no data is being transmitted, and a start delimiter sequence meant to indicate the beginning of a data sequence, the start delimiter including a series of symbols, at least two of which are non-data symbols, a method for determining that a start delimiter is being correctly received comprising the steps of:
   A. when a silence sequence has been received more recently than a start delimiter, allowing only one symbol error before reporting an error; and
   B. when a start delimiter has been received more recently than a silence sequence, allowing at least one symbol error per pair of non-data symbols before reporting an error.

7. A method as in claim 6 wherein a lower-amplitude level and an upper-amplitude level represent the two data symbols, and a mid-amplitude level represents the non-data symbol, the method further comprising:

C. when the start delimiter has been received more recently than a silence sequence, using a two-level slicer to detect the data symbol portions of the start delimiter.

8. A method of operating a local area network modem receiver to report errors to an upper level, the receiver for receiving symbol frames which include sequences of symbols, the sequences including a pseudo-silence sequence, a preamble sequence, a start delimiter sequence, a data sequence, and an end delimiter sequence, the error-reporting method comprising the steps of:

A. when a pseudo-silence sequence is expected, accepting as many as three received symbol errors for every four received symbols without reporting an error to the upper level; and B. when a start delimiter sequence is expected, accepting one symbol error per start delimiter sequence without reporting an error to the upper level.

9. A method as in claim 8 wherein the start delimiter error reporting method additionally comprises:

C. accepting as many as five received symbol errors per eight received symbols when a start delimiter is expected, and the start delimiter is byte-aligned with a prior start delimiter, and no silence sequence has been received more recently than the prior start delimiter.

10. A method as in claim 8 wherein the error reporting method additionally comprises:

D. accepting as many as five received symbol errors per eight received symbols when a end delimiter is expected, and the end delimiter is byte-aligned with a prior start delimiter, and no silence sequence has been received more recently than the prior start delimiter.

* * * * *